March 19, 1968

W. A. ALBRECHT 3,373,726

FUEL VAPORIZER FOR INTERNAL COMBUSTION ENGINES

Filed Feb. 17, 1966

INVENTOR
WALTER A. ALBRECHT

BY

GEORGE W. WRIGHT, JR.

ively appear as the nature of the invention is better

United States Patent Office 3,373,726
Patented Mar. 19, 1968

3,373,726
FUEL VAPORIZER FOR INTERNAL
COMBUSTION ENGINES
Walter A. Albrecht, 141 W. Chestnut St.,
Burlington, Wis. 53105
Filed Feb. 17, 1966, Ser. No. 528,112
1 Claim. (Cl. 123—122)

ABSTRACT OF THE DISCLOSURE

A device for preheating and prevaporizing liquid fuel emanating from an automotive carburetor system having a U-shaped bracket formed from a single length of strip metal insertable in the intake manifold of an engine below the carburetor. The U-shaped bracket having vertically extending substantially parallel legs between which is mounted a heating coil also extending in a vertical position. The heating coil being in a position directly in the path of the fuel sprayed from the carburetor. The vertical legs also being positioned in such a manner as to not obstruct or be in the path of the fuel and the heating element being in an electric circuit in connection with the batteries of the vehicle and vehicle's ignition switch.

---

Figure 1:
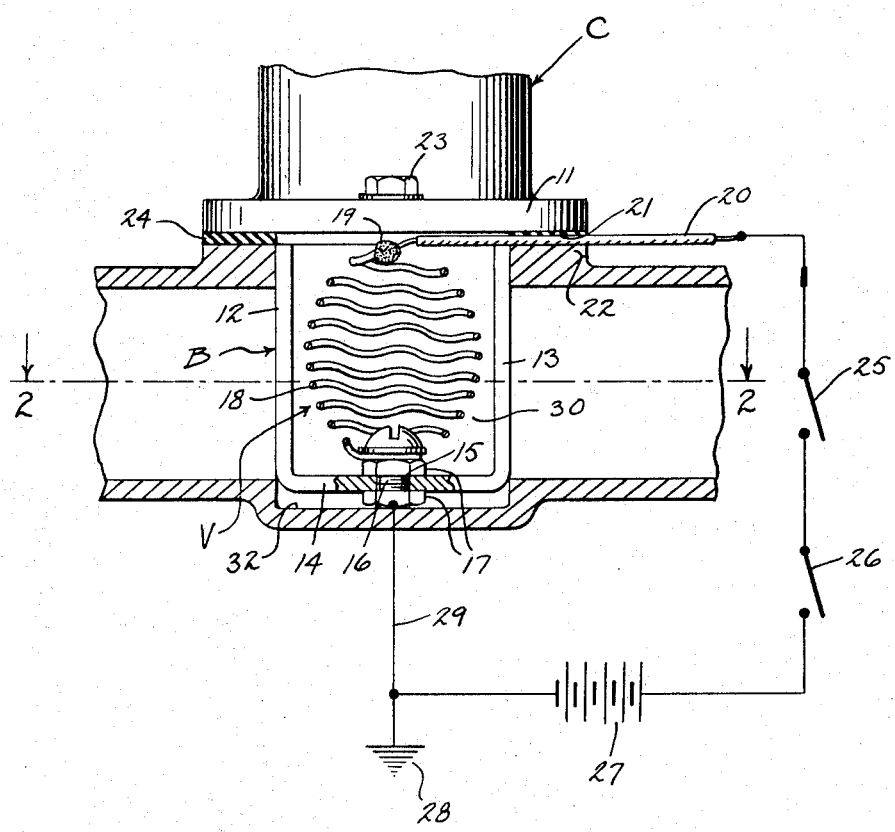

This invention appertains to a fuel vaporizer for internal combustion engines and more particularly to an improved means for preheating and vaporizing the fuel to promote the starting of internal combustion engines, particularly at extremely low temperatures. In internal combustion engines, and especially those utilizing gasoline as a fuel, the fuel is fed into a carburetor where it is mixed with air in proper proportions and atomized. The resulting mixture is then sprayed into the intake manifold for suction into the cylinders. The atomized gasoline mixture usually will readily vaporize and is thus easy to ignite to produce the necessary explosion for driving and operating the cylinders.

When an engine is exposed to extremely low temperatures, however, for a relatively prolonged period, the gasoline mixture does not readily vaporize and pools of gasoline form in the intake manifold and often an inadequate amount of gasoline is fed to the cylinders, or gasoline in a liquid form is sucked into the cylinders, making it difficult to ignite and produce the explosion necessary for actuating pistons.

It is, therefore, a prime object of the present invention to provide a vaporizer wherein the atomized gasoline mixture is preheated and thus will function in the capacity of a booster in starting an engine in cold climates.

An important object of the present invention is to provide a vaporizer of the character described which will aid in eliminating escape of exhaust smokes and fumes resulting from incomplete combustion, by assuring vaporization of the fuel prior to injection into the engine.

A further object of the present invention is to provide an improved fuel vaporizer for gasoline operated internal combustion engines which is located within the intake manifold and positioned near the floor of the manifold where it will be most effective in the prevaporization of the fuel received from the carburetor and prior to its injection into the cylinders.

Still another object of the present invention is to provide and electric heating element in the intake manifold of an internal combustion engine below the base of the carburetor throat for effectively vaporizing the fuel and which element may be either manually or automatically energized upon the starting of the motor.

A further object of the present invention is to provide a device of the above character which is located primarily in the intake manifold of an internal combustion engine and which provides very little, if any, obstruction to the natural flow of the atomized and vaporized fuel.

A still further object of the invention is to provide a device of the above character which will readily preheat and vaporize the fuel mixture induced from the carburetor and which will require very little, if any, modification of the standard parts of the vehicle engine.

A salient feature of the present invention is to provide a novel preheating means to aid in the vaporization of the fuel induced from the carburetor, which is slipped into the space provided in the standard intake manifold below the carburetor base, and having a coil adapted to be preheated upon the actuation of the starter switch of an internal combustion engine to preheat and thus vaporize the gas mixture thoroughly prior to its entering the cylinders.

A further object of the invention is to provide a simple, practical and reliable construction that is economical to manufacture, easy to assemble and positive in its operation.

With these and other objects in view, which will more readily appear as the nature of the invention is better understood, the same consists in the novel construction, combination and arrangement of parts as will be hereinafter more fully described, illustrated and claimed.

Figure 2:
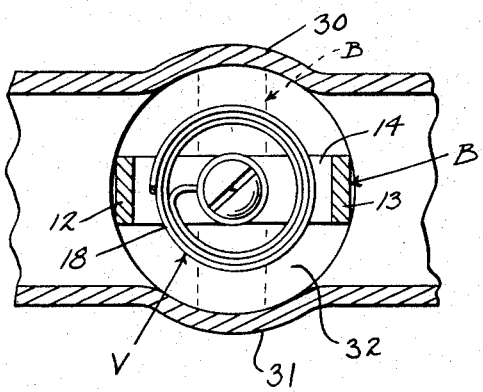

A preferred and practical embodiment of the invention is shown in the accompanying drawing, in which, FIGURE 1 is a fragmentary vertical section through an intake manifold at the base of the carburetor throat showing details in construction of the prevaporization element, and FIGURE 2 is a horizontal section through the intake manifold and the novel fuel vaporizer taken on the line 2—2 of FIGURE 1 of the drawing, and looking in the direction of the arrows.

Referring now to the drawing in detail, wherein similar reference characters designate corresponding parts throughout the several views, the letter V generally indicates one type of the improved fuel vaporizer shown associated with the intake manifold of an internal combustion engine (not shown), below the base 11 of the carburetor C. The novel and improved fuel vaporizer forming part of the present invention includes a U-shaped supporting bracket B formed from a single strip of metal bent so as to include the vertically extending legs 12 and 13 connected by base strip 14. Base strip or stretch 14 is provided at its axial center with an opening 15 which receives a threaded bolt 16 and this bolt is provided with a pair of nuts 17 so arranged as to lock the bolt firmly to the base stretch 14. Under the head of the bolt 16 I secure one end of a spring type heating element 18 and this element may be formed from any type of resistant wire and is generally of a coiled shape. The heating element should be responsive to a 14 amp current so that the ordinary vehicle battery will readily provide the necessary current for the same. The upper end of this spring wire heating elements is welded or otherwise joined, as at 19, to a relatively thick wire 20. The element is of a size and configuration to be received within the vertical legs 12 and 13 and out of contact therewith and of a sufficient strength so that it will remain in an upright position when wire 20 is firmly secured in place between the base 21 of the carburetor, and the thickened peripheral lip 22 forming the opening at the lower throat of the carburetor C. The base, of course is secured to the intake manifold 10 by the usual bolts 23 and is insulated or sealed by means of the gasket member 24 and preferably the wire 20 is of such a thickness for example, number 14 plastic coated wire, that the gasket may be readily compressed about the same. I may, however, if necessary form a groove in the gasket or even in the thickened peripheral upper edge 22 to receive the wire. Wire 20 leads to a connector and is then connected to a heavier type wire, for example in the nature of a number 16 wire, to a push-pull switch 25 and from there the wire leads to the ordinary ignition switch 26 of the vehicle electrical system. This switch 26 is of course connected by wire to the battery 27 and the battery is grounded at 28 in the usual manner. The lower end of the heating element 18 is grounded through the intake manifold as indicated and represented by the line 29 thus completing the circuit. This ground is actually accomplished through the regular battery ground and the press fit of the U-shaped bracket engaging the walls of the intake manifold.

It should be borne in mind that the manual push-pull switch 25 may be eliminated and a thermal switch incorporated in the circuit, which is responsive to the temperature of the radiator or water jacket and could for example be closed below temperatures of 100 to 120 degrees and automatically opened and break the circuit above the aforementioned degrees when the motor is sufficiently heated to automatically achieve the vaporization of the fuel.

In the operation of the device the manual switch 25 is closed prior to turning on the ignition switch 26. Thus when the vehicle operator closes the ignition switch the circuit will be complete and the coil will immediately become heated. As the engine is turned over the carburetor becomes ready to feed gasoline into the intake manifold and under adverse conditions which deter the vaporization of the gasoline within the manifold the heated coil will serve to produce the proper vaporization of the fuel mixture. The position and shape of the coil is also important and it is to be noted that the coil is widest adjacent the center thereof and thus the gasoline will impinge upon some part of the coil as it is moved from the carburetor into the intake manifold. Since there is no connection other than the legs 12 and 13 which snugly fit the throat below the base of the carburetor, there will be no obstruction to the free flow of the vaporized fuel and no danger of interfering with the vacuum. If a thermal switch is utilized in lieu of the push-pull switch 25 the thermal switch will be closed at all times at temperatures below 100 or 120 degrees. However where the manual switch is utilized, as the engine heats up the operator merely opens switch 25 to disconnect the coil from the circuit and then no current will flow to the coil.

From the foregoing, it can be seen that I have provided a very simple yet effective means for vaporizing the atomized fuel as it is introduced from the throat of the carburetor C and prior to its entrance into the main body of the intake manifold 10. Also little or no modification of the standard automotive parts is required and very little, if any, obstruction is offered to the free movement of the vaporized fuel.

In this regard, attention is directed to FIGURE 2 of the drawing, wherein in dotted lines I have shown legs 12 and 13 in position adjacent the side walls 30 and 31 of the intake manifold, and thus the legs would in no way obstruct the flow of fuel to the cylinders. This is the preferred position of the legs 12 and 13, but for purposes of illustration, I have shown in full lines the legs 12 and 13 in line with the main body of the intake manifold. Again, it should be stressed that the full line position of the bracket and its vertical legs 12 and 13 is merely for the purpose of illustration, and not to be construed as the main position. The operative position being shown in dotted lines in FIGURE 2.

It should also be noted that the troat opening of the intake manifold adjacent the base 21 of the carburetor may vary and that the indented circular well 32 shown in the drawing may not be found in some models. It is obvious that the bracket B can be adapted to any shape and is formed in a size and configuration so that the upper ends 33 thereof are snugly received within the throat immediately adjacent the base of the carburetor C and that the device will be firmly held in place as shown.

Thus, while I have described and shown certain specific embodiments of the invention, it will be understood that these are merely for the purpose of illustration and description, that various other forms may be devised and that changes may be made in the proportions and minor details of construction without departing from the spirit of the invention or scope of the appended claim.

What I claim as new is:

1. A device for the prevaporization and atomizing of liquid fuel in an automotive carburetor system insertable in the intake of an engine between the carburetor and the intake manifold thereof, comprising a U-shaped bracket formed from a single length of strip metal to include, a base section, and a pair of upright substantially parallel spaced legs, said legs snugly engaging a portion of the walls of the inlet throat and being positioned adjacent said walls and in alignment therewith and out of the path of the free flow of the vaporized fuel; a coil heating element carried by said bracket in the path of the fuel introduced from the carburetor, said coil heating element being positioned vertically between said spaced parallel legs and extending from the intake throat to a point adjacent the floor of the intake manifold; an electric circuit including said coil heating element in connection with the battery of a vehicle and the vehicle ignition switch, and a second switch in said circuit for opening and closing said circuit independent of the vehicle ignition switch, whereby fuel introduced from the carburetor contacts the heating element for the prevaporizing of the same and whereby said parallel spaced legs do not obstruct the free flow of the vaporized fuel.

References Cited

UNITED STATES PATENTS

| 1,143,092 | 6/1915 | Unckles | 123—122 |
| 1,824,985 | 9/1931 | Edelman | 123—122 |
| 2,139,777 | 12/1938 | Skok et al. | 123—122 |
| 2,177,840 | 10/1939 | Roualet | 123—122 |
| 2,576,401 | 11/1951 | Kimmell | 123—122 |
| 2,582,389 | 1/1952 | McDonnell | 123—122 |
| 2,700,722 | 1/1955 | Gurley | 123—122 |

CARLTON R. CROYLE, *Primary Examiner.*